United States Patent
Abarca et al.

(10) Patent No.: US 9,008,591 B2
(45) Date of Patent: Apr. 14, 2015

(54) REMOTE AUDIO KEEP ALIVE FOR WIRELESS DISPLAY

(75) Inventors: Gabriel Abarca, Richmond Hill (CA); Keith Shu Key Lee, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 185 days.

(21) Appl. No.: 13/530,361

(22) Filed: Jun. 22, 2012

(65) Prior Publication Data

US 2013/0344822 A1 Dec. 26, 2013

(51) Int. Cl.
*H04B 1/38* (2006.01)
*H04L 29/06* (2006.01)
*H04W 56/00* (2009.01)
*H04W 76/04* (2009.01)

(52) U.S. Cl.
CPC .............. *H04L 29/06* (2013.01); *H04W 56/00* (2013.01); *H04W 76/045* (2013.01)

(58) Field of Classification Search
USPC ............................... 455/3.02, 3.06, 41.2, 90.1
See application file for complete search history.

(56) References Cited

U.S. PATENT DOCUMENTS

| | | | |
|---|---|---|---|
| 7,873,064 B1 | 1/2011 | Li et al. | |
| 8,090,235 B2 * | 1/2012 | Waki | 386/231 |
| 8,341,680 B2 * | 12/2012 | Matsuda | 725/88 |
| 8,422,996 B2 * | 4/2013 | Kim | 455/412.2 |
| 2006/0245729 A1 * | 11/2006 | Itoh et al. | 386/96 |
| 2008/0040759 A1 | 2/2008 | She et al. | |
| 2009/0034937 A1 | 2/2009 | Kusunoki et al. | |
| 2012/0046956 A1 | 2/2012 | Stewart et al. | |
| 2013/0141643 A1 | 6/2013 | Carson et al. | |
| 2013/0166052 A1 | 6/2013 | Kadiyala et al. | |

FOREIGN PATENT DOCUMENTS

| | | |
|---|---|---|
| WO | WO 2005/015907 A1 | 2/2005 |
| WO | WO 2007/017970 A1 | 2/2007 |
| WO | WO 2010/111261 A1 | 9/2010 |
| WO | WO 2012/021973 A1 | 2/2012 |

OTHER PUBLICATIONS

International Search Report for International Application No. PCT/IB2013/001750, Canadian Intellectual Property Office, Canada, mailed on Oct. 24, 2013.

* cited by examiner

*Primary Examiner* — Tuan H Nguyen
(74) *Attorney, Agent, or Firm* — Volpe and Koenig, P.C.

(57) ABSTRACT

An apparatus and method is provided for improving initialization and synchronization of display devices to audio data. Current implementations to retain synchronization between a transmitter and a display use "Keep Alive" silent audio data stream in the format of the latest data stream on an interface between the transmitter and the display even when no data is available. Implementing the above solution in a system where the silent audio data stream is transmitted over a wireless link is bandwidth and power inefficient. The techniques provide an apparatus and method to efficiently generate and transmit silent audio data stream for maintaining synchronization.

24 Claims, 4 Drawing Sheets

REMOTE AUDIO KEEP ALIVE FOR WIRELESS DISPLAY

BACKGROUND

1. Field of the Present Invention

The present invention relates generally to computing processing and, more particularly, to a method and system for improving initialization and synchronization of display devices to audio data.

2. Description of the Related Art

A data stream transmitted on interfaces for display receivers, such as High-Definition Multimedia Interface (HDMI), DiplayPort, S/PDIF, etc., embeds audio format metadata. When the data stream starts, it can take the display receivers in the order of half a second after the stream starts to detect the audio format metadata (such as sample rate) embedded in the data stream, to initialize, and to synchronize with the data stream. During this initialization time, the audio data is discarded, which can produce clipping of audio sounds. This can be especially notable for short system event sounds.

Current implementations to avoid the problems discussed above are for the interface to always carry "Keep Alive" silent audio data stream in the format of the latest data stream. In other words, a transmitter of the data stream can send a silent audio data stream in the latest format when no data stream is to be sent to the display receiver. Therefore, the display receiver does not need to re-initialize when the data stream re-starts. In order to save dynamic random access memory (DRAM) access power, the silent audio data stream is not generated by a CPU and streamed from system memory, rather it is generated on the interface encoder. An audio driver controls the "Keep Alive" feature.

However, in a system employing a display connected to a wireless receiver, a wireless transmitter is employed to send the data stream over a wireless link to the wireless receiver. The wireless receiver is connected to the display receiver to direct the data stream to the display receiver. In this system, the use of the silent audio data stream sent over the wireless link is both bandwidth and power inefficient. For example, depending on the audio format, a regular audio silent stream would take several or tens of Mbits/s of valuable wireless network bandwidth for no actual data content. Also, especially for mobile wireless audio or audio/video transmitters and receivers, the encoder of the transmitter would have to spend the power to generate regular but zeroed audio packets in the last format and send them to the radio transmitter. The radio transmitter would have to wake up and spend the radio power to send them, and the radio receiver would have to spend the power to send them to the interface encoder. Some aspects of these shortcomings are also present in the wired systems described above. These implementations are inefficient and power and bandwidth consuming.

SUMMARY OF EMBODIMENTS

Therefore, apparatuses and methods are needed to efficiently retain audio synchronization for display receivers including those in a wireless configuration.

According to a first embodiment, there is provided a method for receiving information associated with an audio data and storing the information associated with the audio data. The method further includes transmitting a silent data stream to a display such that the silent data stream is output from the display based on the stored information.

According to another embodiment, an apparatus is provided that includes a radio receiver, a display decoder, and a display transmitter. The radio receiver is configured to receive information associated with an audio data. The display decoder is configured to store the information associated with the audio data. The display transmitter is configured to transmit a silent data stream based on the stored information associated with the audio data to a display.

Another embodiment of the present invention includes an article of manufacture including a computer-readable storage medium having instructions stored thereon, execution of which by a computing device causes the computing device to perform operations including receiving information associated with an audio data and storing the information associated with the audio data. The operations further include transmitting the silent data stream to a display such that the silent data stream is output from the display based on the stored information.

According to a further embodiment of the present invention, there is provided a method comprising transmitting audio data including information associated with the audio data to a receiver, transmitting a request for transmitting silent data stream that causes the receiver to transmit the silent data stream based on the information associated with the audio data to a display in response to the request.

According to a still further embodiment of the present invention, there is provided an apparatus including a radio transmitter and an audio driver. The radio transmitter is configured to transmit audio data including information associated with the audio data to a receiver and to transmit a request for transmitting silent data stream. The audio driver is configured to cause the wireless receiver to transmit the silent data stream based on the information associated with the audio data to a display in response to the request.

According to another embodiment of the present invention, there is provided an article of manufacture including a computer-readable storage medium having instructions stored thereon, execution of which by a computing device causes the computing device to perform operations. The operations can include transmitting audio data including information associated with the audio data to a receiver, transmitting a request for transmitting silent data stream that causes the receiver to transmit the silent data stream based on the information associated with the audio data to a display in response to the request.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
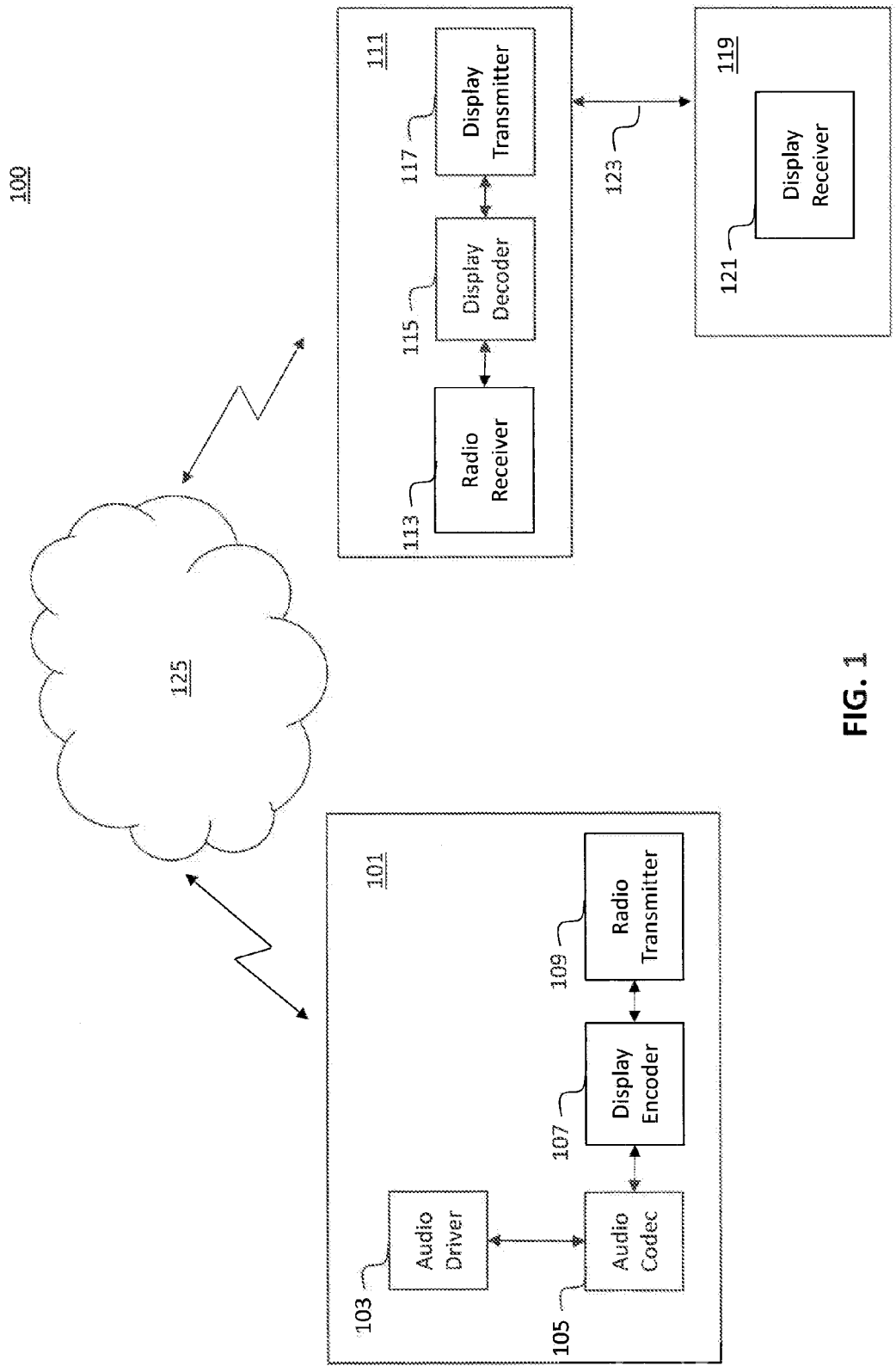
FIG. 1 illustrates a system, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description of the present invention refers to the accompanying drawings that illustrate exemplary embodiments consistent with this invention. Other embodiments are possible, and modifications can be made to the embodiments within the spirit and scope of the present invention. Therefore, the detailed description is not meant to limit the present invention. Rather, the scope of the present invention is defined by the appended claims.

It would be apparent to one of skill in the art that aspects of the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Additionally, and as will be apparent to one of ordinary skill in the art, the simulation, synthesis and/or manufacture of the various embodiments of this invention may be accomplished, in part, through the use of computer readable code (as noted above), including general programming languages (such as C or C++), hardware description languages (HDL) including Verilog HDL, VHDL, Altera HDL (AHDL) and so on, or other available programming and/or schematic capture tools (such as circuit capture tools). This computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core (such as a graphics processing unit (GPU) core) that is embodied in program code and may be transformed to hardware as part of the production of integrated circuits. As will be appreciated, other types of cores or processing units can provide the functions and/or structure embodying aspects of the present invention. These processing units may include, for example, central processing units (CPUs), the aforementioned graphics processing units, digital signal processors, application processors and the like.

Reference to modules in this specification and the claims means any combination of hardware or software components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

FIG. 1 illustrates a system 100, according to an embodiment of the present invention. For example, system 100 can efficiently retain audio synchronization for display receivers. In one example, system 100 comprises a wireless transmitter 101 that communicates with a wireless receiver 111 over a communication network 125. The wireless receiver 111 is communicatively connected to a display 119 using an output device 123. In one example, transmitter 101 includes an audio driver 103, an audio codec 105, a display encoder 107, and a radio transmitter 109. In one example, receiver 111 includes a radio receiver 113, a display decoder 115, and a display transmitter. In one example, display 119 includes a display receiver 121 and an output device 123.

In one example, wireless transmitter 101 is configured to transmit audio, video, or other data, e.g., as data streams, to the wireless receiver 111 over communication network 125. Wireless receiver 111 is configured to receive the data stream via output device 123 and prepare the received data for presentation on, for example, on display 119. Output device 123 can be a wireless or wired interface, for example, but not limited to, a High-Definition Multimedia Interface (HDMI), DiplayPort, S/PDIF, etc.

In one example, communication network 125 can include, but is not limited to, personal area networks, local area network, mesh network, metropolitan area network, wide area network, mobile network (such as global system for mobile communications, personal communications service, digital advance mobile phone service, etc.), or the like.

In one example operation, when a new data stream is received by wireless receiver 111, there is a delay before display 119 initializes and synchronizes with the wireless receiver 111 to effectively receive the data stream. This can result in clipping of audio and/or video stream included in the received data stream. As discussed above, the Keep Alive procedure has been implemented so that a transmitter of the data stream can transmit silent audio data stream during the periods where no data stream is available. Therefore, the display 119 does not need to initialize and synchronize each time a data stream is transmitted. However, if the current implementation of Keep Alive is applied to a system such as those including wireless transmitters and receivers, transmitting silent audio data stream by the wireless transmitter results in inefficient use of the wireless bandwidth and the power of the wireless transmitter. Similar power inefficiencies and use of bandwidth may also exist in wired embodiments.

Accordingly, system 100 is configured to shift generation of the silent audio data stream from the transmitter (e.g., wireless transmitter 101), as was previously done, to the receiver (e.g., wireless receiver 111). In this example, the wireless transmitter 101 is configured to transmit data stream to the wireless receiver 111. In one example, wireless transmitter 101 is configured to send a request to the wireless receiver 111 to start a remote Keep Alive process on the wireless received 111 when the wireless transmitter 101 detects that no more data stream is to be transmitted. Additionally or alternatively, the wireless receiver 111 can start a remote Keep Alive process when the wireless receiver 111 has received an enable bit from the wireless transmitter 101 for remote audio keep alive and detects that no more audio and/or video data is received from transmitter 101.

In one example, the wireless receiver 111 is configured to store information associated with the received data stream, such as metadata associated with the data stream. The metadata can include, but is not limited to, information regarding the communication network 125, information regarding the data stream, etc. When the wireless receiver 111 receives the request for remote Keep Alive process and/or detects that no more audio and/or video data is received, the wireless receiver 111 transmits silent audio data stream to the display 119. In one embodiment the silent audio data stream includes the stored metadata. Additionally or alternatively, the silent audio data stream is sent to the display 119 based on the stored metadata. Therefore, display 119 still receives a data stream based on the latest information although no data stream is sent from the wireless transmitter 101. According to some embodiments, information associated with the data stream, such as metadata associated with the data stream, can be communicated from the wireless transmitter 101 to the wireless receiver 111 during an initialization phase between two devices. According to these embodiments, the wireless receiver 111 can start the remote Keep Alive process as soon as the wireless receiver 111 receives an enable bit from the transmitter 101 based on the information received in the initialization phase. Additionally or alternatively, any change in the information associated with data stream can be communicated from the wireless transmitter 101 to the wireless receiver 111 before the data stream is sent by the wireless transmitter 101.

In one example, audio codec 105 can include hardware, software, or a combination thereof capable of coding or decoding a digital data stream or signal. For example, audio codec 105 can implement an algorithm to compress and/or decompress digital audio data according to a format. Additionally or alternatively, the audio codec 105 can encode analog audio as a digital signal and decode the digital signal to the analog signal. For example, the audio codec 105 can include an Analog-to-Digital converter (ADC) and/or a Digital-to-Analog converter (DAC). In this example, audio codec 105 can be used to perform additional processes on the data stream generated by the audio driver 103.

The audio codec 105 can be communicatively connected to display encoder 107. Display encoder 107 can be configured to capture, compress, and/or convert audio/video data. In one example, the display encoder 107 is configured to receive the data stream from, for example, the audio codec 105, and further process the data stream such that the data stream is ready for transmission over the communication network 125.

The encoded audio/video data stream is received by radio transmitter 109 from display encoder 107 before transmission to wireless receiver 111. Radio transmitter 109 can be connected to an antenna system (not shown) to transmit the data stream. According to one example, radio transmitter 109 can be configured to transmit audio and/or video data, e.g., as a data stream, including information associated with the data stream to wireless receiver 111 and also, radio transmitter 109 can be configured to transmit a request for remote Keep Alive. Additionally, radio transmitter 109 can transmit an initialization request to wireless receiver 111 and can receive an acknowledgement from wireless receive 111. The acknowledge can indicate an ability of wireless receiver 111 to transmit the silent data stream. Additionally, radio transmitter 109 can be configured to transmit a request to stop the remote Keep Alive process.

According to one example, audio driver 103 can detect, using, for example, the initialization process, whether wireless receiver 111 is capable of performing remote Keep Alive. In this example, audio driver 103 and wireless receiver 111 can use query message to determine whether the receiver is capable of performing remote Keep Alive process. In addition to the initialization process (e.g., connection set up), the capability query bits can also be used during format change messages. For example, in response to an initialization message from audio driver 103, wireless receiver 111 sends a capability query bit (or bits) indicating capability of performing remote Keep Alive process. Additionally, audio driver 103, knowing wireless receiver 111 is capable of performing Keep Alive process, can cause wireless receiver 111 to transmit the silent data stream based on the information associated with the audio data stream to display 119 in response to a request for Keep Alive process. Also, audio driver 103 can cause wireless receiver 111 to discontinue transmitting the silent data stream to display 119, when audio driver 103 determines that additional data stream is to be sent to wireless receiver 111, and therefore, there is no need for silent audio data.

On the receiver side, wireless receiver 111 can include a radio receiver 113 configured to receive the transmitted data stream. Radio receiver 113 can be connected to and/or include an antenna system (not shown) to receive the data stream. Wireless receiver 111 can further include a display decoder 115 and/or an audio codec (not shown) to convert the received data stream to a format compatible for display on display 119.

The reformatted data stream is further sent to display transmitter 117. Display transmitter 117 is configured to transmit the data stream to display 119 over output device 123. A display receiver 121 in display 119 is configured receive the data stream and prepare the data stream for display through output 123.

According to one exemplary embodiment, wireless transmitter 101 is configured to send an initialization request to wireless receiver 111 when transmitter 101 first initiates transmission of data stream to receiver 111. In this exemplary initialization, transmitter 101 and receiver 111 can communicate whether a remote Keep Alive capability exits. For example, wireless receiver 111 (using for example radio receiver 113) can transmit capability query bit (or bits) to wireless transmitter 101 indicating that wireless receiver 111 can perform remote Keep Alive. In the example where wireless receiver 111 can perform remote Keep Alive, wireless transmitter 101 can send an enable bit to receiver 111 to enable this capability.

Continuing with this exemplary embodiment, wireless transmitter 101 starts transmitting audio and/or video data stream to wireless receiver 111 for display on display 119. Wireless receiver 111, for example using radio receiver 113, receives the data stream, reconfigures the data stream to a configuration suitable for transmission to display 119 (using for example display decoder 115), and transmits the reconfigured data stream to display 119 (using for example display transmitter 117). Additionally, wireless receiver 111 (using, e.g., display decoder 115) is capable of detecting additional information related to and/or included in the audio and/or video data stream, such as, but not limited to, channel information, audio metadata, etc. Wireless receiver 111, using for example display decoder 115, can store the additional information such that when the data stream stops, wireless receiver 111 can transmit silent audio data stream, using for example display transmitter 117, to display 119 based on the stored additional information.

If wireless transmitter 101 detects that no more audio and/or video data stream is available for transmission, wireless transmitter 101 can send a request to wireless receiver 111, using for example radio transmitter 109, to start the remote Keep Alive procedure. When wireless receiver 111 receives the request for remote Keep Alive, wireless receiver 111 uses the stored additional information related to the latest received audio and/or video data stream to transmit silent audio data to display 119. Therefore, from the point of view of display 119, display 119 continuously receives audio data (whether from transmitter 101 or silent data), which eliminates the need for additional synchronization when the data stream from transmitter 101 re-starts.

According to one example, when wireless transmitter 101, using for example audio driver 103, detects that more audio and/or video data stream is available for transmission, transmitter 101 can send a request to wireless receiver 111 to stop the remote Keep Alive procedure. Transmitter 101 can further continue transmission of the data stream. Additionally or alternatively, transmitter 101 can start transmission of the data stream without sending a request to stop remote Keep Alive. In one example, receiver 111 can stop remote Keep Alive procedure and continue transmitting the data stream received from transmitter 101. Receiver 111 can determine whether the additional information associated with the re-started data stream is similar to the stored additional information. In one example, receiver 111 is configured to determine the similarity based on, for example, the source of the data stream, the transmitter of the data stream, the channel information, metadata associated with the data stream, etc. If the information is similar, receiver 111 can send the data stream to display 119. If the information is not similar, receive 111 can store the new additional information associated with the new data stream that can be used for later remote Keep Alive procedure.

Figure 2:
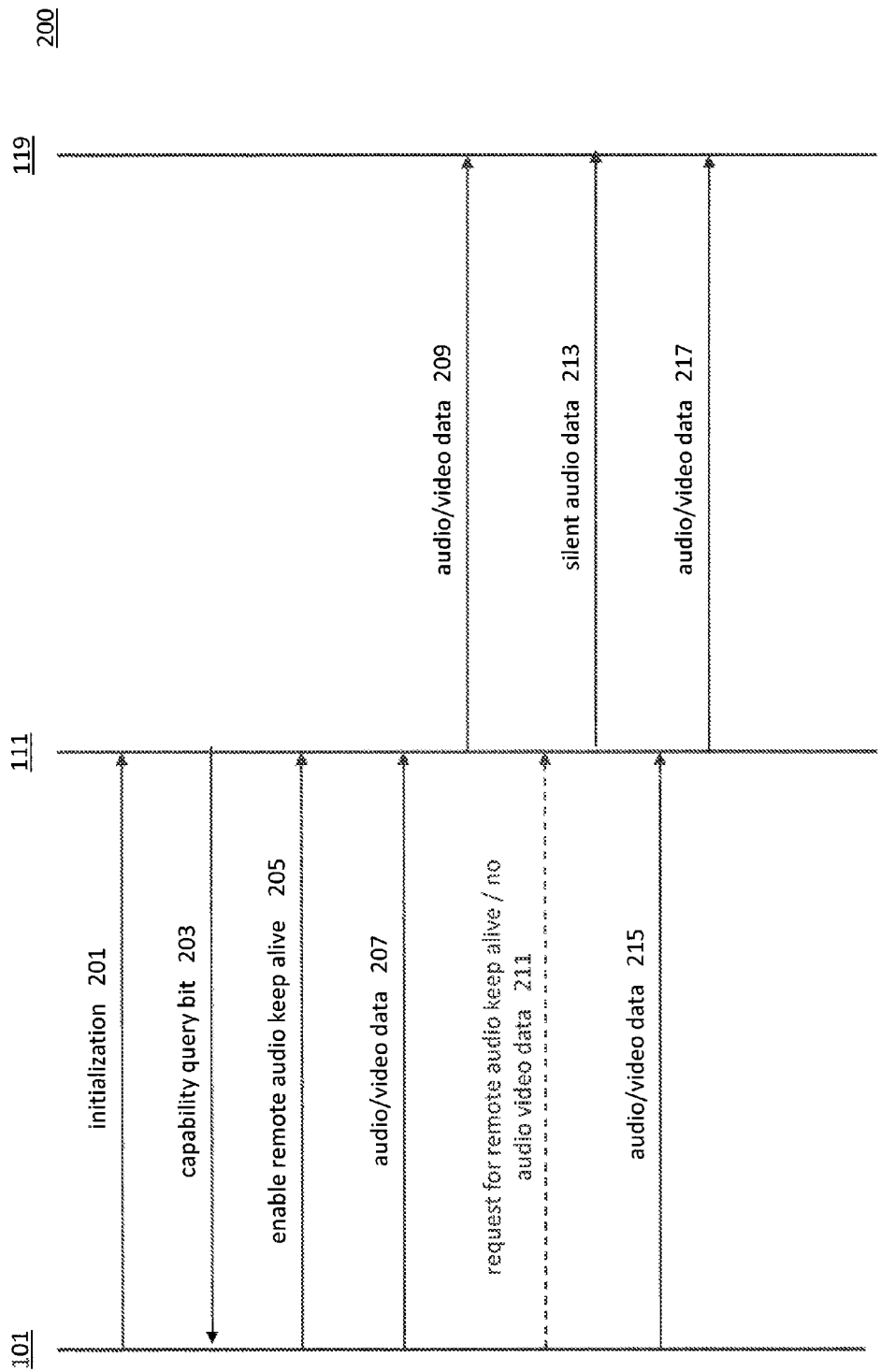
FIG. 2 illustrates a timing diagram, in accordance with an embodiment of the present invention.

FIG. 2 illustrates a timing diagram 200, according to an embodiment of the present invention. For example, timing diagram 200 can represent generation and transmission of a silent audio data stream for efficiently retaining audio synchronization for display receivers. Description of FIG. 2 will be made with respect to system 100 in FIG. 1, merely as an example system for implementing this timing sequence.

According to this example, wireless transmitter 101 transmits an initialization request 201 to wireless receiver 111. Initialization request 201 can be generated and transmitted when transmitter 101 and receiver 111 first communicate. In one example, receiver 111 sends a response to request 201, which includes capability query bit (or bits) 203 indicating to transmitter 101 that receiver 111 has the capability to perform remote Keep Alive procedure.

Transmitter 101 can send a request 205 enabling remote Keep Alive in receiver 111. In this example, transmitter 101 requests that receiver 111 start the remote Keep Alive procedure when transmitter 101 requests and/or when receiver 111 detects that audio and/or video data stream from transmitter 101 has stopped.

Next, transmitter 101 starts transmitting audio and/or video data stream to receiver 111. In one example, the audio and/or video data stream 207 includes and/or accompanied by additional information such as channel information, audio metadata, etc. Receiver 111 receives the audio and/or video data stream 207, stores information associated with the data stream 207, reconfigures the data stream to a configuration suitable for display 119, and transmits the reconfigured data stream 209 to display 119.

According to some embodiments, if no more audio and/or video data stream is available for transmission (211), receiver 111 detects that no more audio and/or video data stream is available and receiver 111 begins transmitting silent audio data stream 213 to display 119. According to these embodiments, receiver 111 has previously received request 205 enabling remote Keep Alive and therefore, detecting that no more audio and/or video data stream is available enables receiver 111 to begin transmitting silent audio data stream 213 to display 119. Additionally or alternatively, when transmitter 101 detects that no more audio and/or video data stream is available for transmission and in order to retain the synchronization with display 119, transmitter 101 sends a request for remote Keep Alive 211 to receiver 111. When receiver 111 receives request 211, receiver 111 begins transmitting silent audio data stream 213 to display 119. Silent audio data 213 is audio data generated based on the stored information associated with the latest audio and/or video data stream 207, which will not produce any sound in display 119. However, silent audio data 213 eliminates the need for additional synchronization between display 119 and receiver 111 and/or between display 119 and transmitter 101 when the data stream resumes.

When audio and/or video data stream 215 resumes, receiver 111 can send reconfigured audio and/or video data stream 217 to display 119. In one example, data stream 215 can be the same or similar as the data stream 207. In this example receiver 111 can transmit data stream 217 to display 119 without storing additional information associated with data stream 215. Alternatively, the data stream 215 can be different from data stream 207. In this example, receiver 111 stores additional information associated with data stream 215 for the remote Keep Alive procedure. In one example, receiver 111 can detect the difference between the data streams 207 and 215 by inspecting the additional information associated with them. Additionally or alternatively, the transmitter 101 can inform receiver 111 that the data streams are different. According to another example, receiver 101 can send a request to stop the remote Keep Alive procedure before the data stream 215 restarts.

Figure 3:
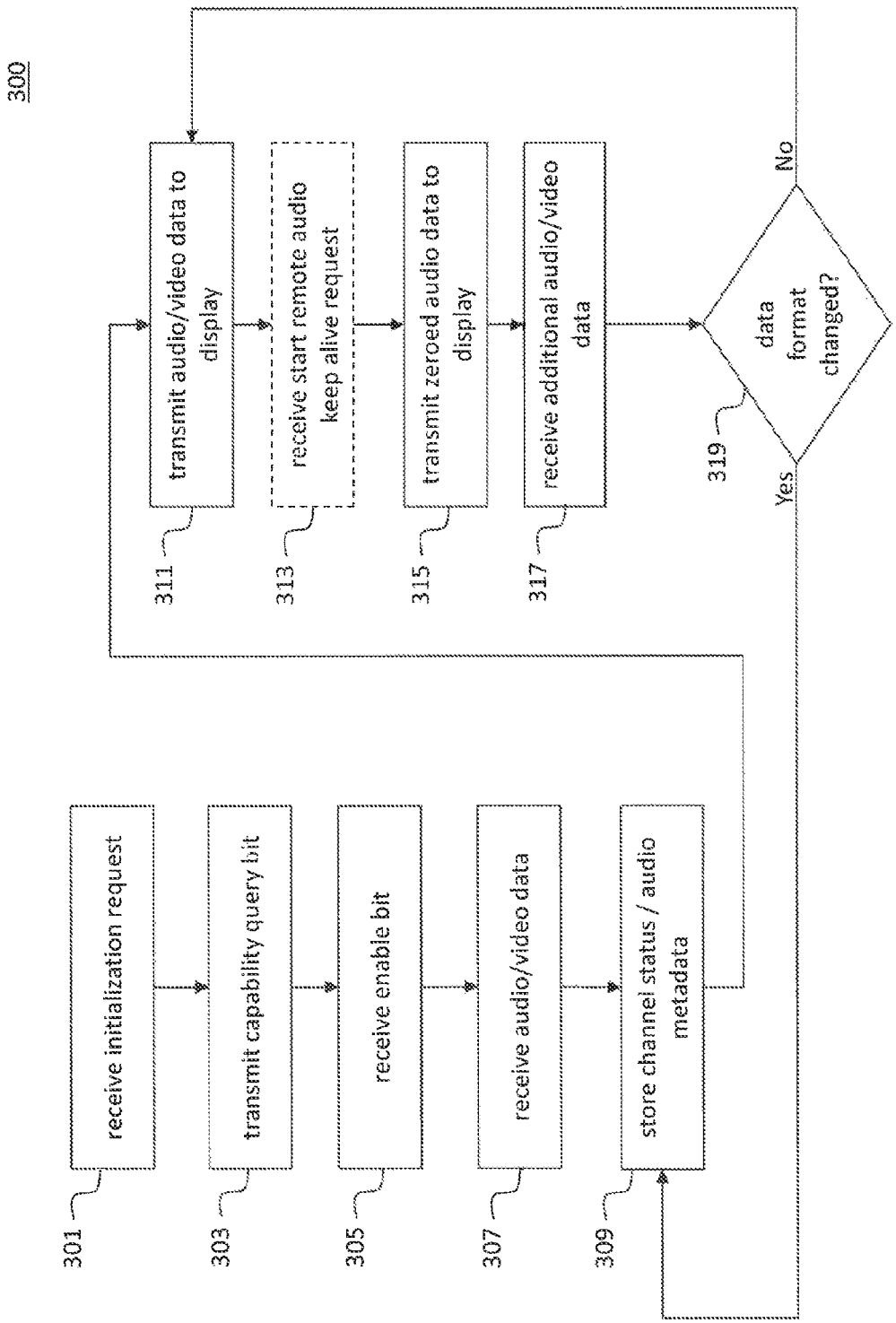
FIG. 3 is a flowchart illustrating a method, in accordance with an embodiment of the present invention.

FIG. 3 is a flowchart depicting a method 300, according to an embodiment of the present invention. For example, method 300 can efficiently retain audio synchronization for display receivers performed in a wireless receiver. In one example, method 300 is performed by system 100. It is to be appreciated not all steps may be needed or performed in the order shown in FIG. 3. Reference is made to system 100 in FIG. 1 merely for convenience of discussion. Other system may be used to perform the method.

In step 301, a receiver 111 receives an initialization request. In one example, as part of the initialization request, the receiver 111 is requested to indicate whether receiver 111 has capability for remote Keep Alive procedure.

In step 303, a capability query bit (or bits) is sent indicating the capability for remote Keep Alive.

In step 305, an enable bit (or bits) is received by, for example, receiver 111 requesting the receiver to perform remote Keep Alive procedure, when needed. The enable bit (or bits) can be part of any communication between, for example, transmitter 101 and receiver 111.

In step 307, audio and/or video data stream is received.

In step 309, information associated with the data stream is stored such that this information can be further used for silent audio data stream.

In step 311, receiver 111 can transmit the received data stream to display 119. In one example, receiver 111 is capable of transforming the received data stream from the configuration sent by, for example, transmitter 101 to a configuration suitable for display 119.

In an optional step 313, a request for remote Keep Alive is received.

Additionally or alternatively, receiver 111 can detect that the data stream received in step 307 has stopped and therefore, receiver 111 can initiate the remote Keep Alive process. In this example, receiver 111 has previously received request enable bit in step 305, and therefore, detecting that no more audio and/or video data stream is available enables receiver 111 to begin transmitting silent audio data stream.

In step 315, silent audio data is transmitted to, for example, display 119.

In step 317, additional audio and/or video data stream is received.

In step 319, it is determined whether the data stream received in step 317 has different format than the data stream received in step 307. If different, the process can continue on step 309. If similar data format is detected for both data streams, the process can continue at step 311.

Figure 4:
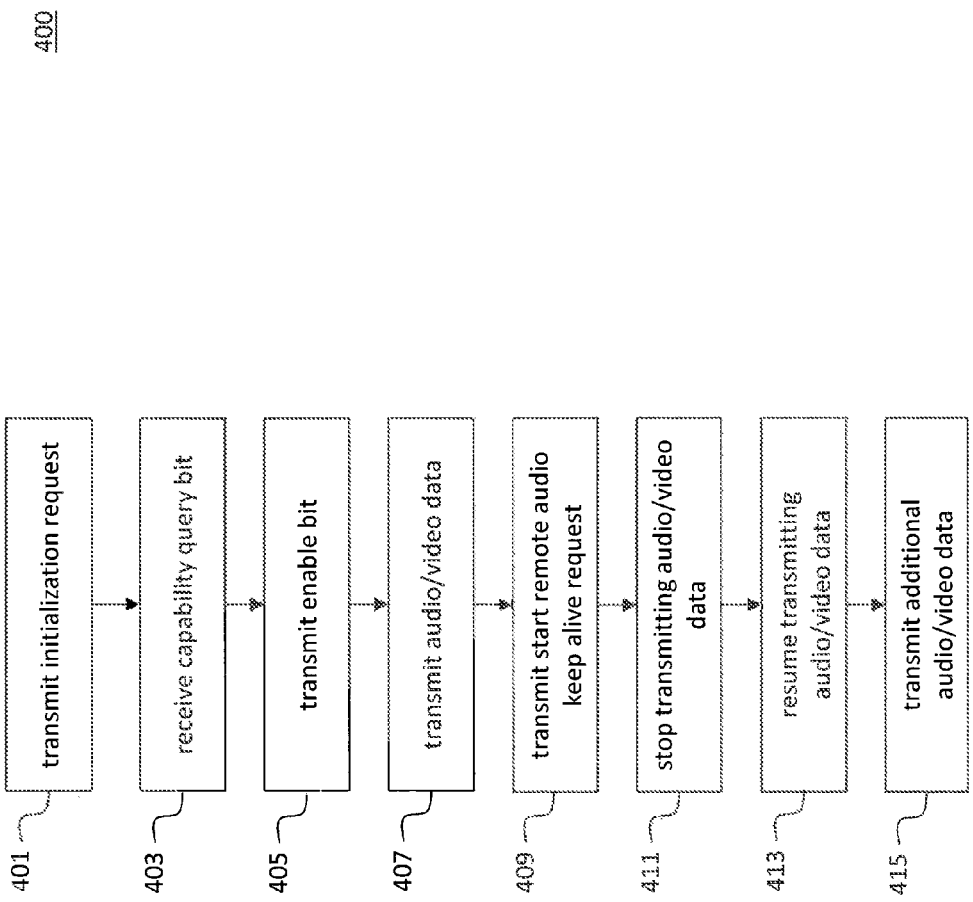
FIG. 4 illustrates a flowchart illustrating a method, in accordance with an embodiment of the present invention.

FIG. 4 illustrates a flowchart depicting a method 400, according to an embodiment of the present invention. For example, method 400 can efficiently retain audio synchronization for display receivers performed in a wireless transmitter. In one example, method 400 is performed by system 100. It is to be appreciated not all steps may be needed or performed in the order shown in FIG. 4. Reference is made to system 100 in FIG. 1 merely for convenience of discussion. Other system may be used to perform the method.

In step 401, an initialization request is sent from a transmitter 101 to receiver 111 to detect whether the receiver is capable of performing remote Keep Alive process.

In step 403, a capability query bit (or bits) is received, indicating whether the receiver is capable of remote Keep Alive.

In step 405, an enable bit is transmitted if the receiver indicates its capability.

In step 407, the audio and/or video data stream is transmitted.

In step 409, when transmitter 101 determines no more audio and/or video data stream is present for transmission to the receive 111, transmitter 101 transmits a request for Keep Alive process to receiver 111.

In step 411, no more audio and/or video data stream is transmitted.

However, when additional audio and/or video data stream is presented in step 413, the additional data stream is transmitted in step 415.

The embodiments described above can be described in a hardware description language such as Verilog, RTL, netlists, etc. and that these descriptions can be used to ultimately configure a manufacturing process through the generation of maskworks/photomasks to generate one or more hardware devices embodying aspects of the present invention as described herein.

Embodiments of the present invention yield several advantages over conventional methods of transferring processing outputs to memory. By opportunistically combining data outputs from one or more processing units and address information associated with the data outputs, embodiments of the present invention better utilize the entire communication bandwidth available from the processing units to the memory in order to yield substantially faster transfers of the output data to memory.

The embodiments described above can be described in a hardware description language such as Verilog, RTL, netlists, etc. and that these descriptions can be used to ultimately configure a manufacturing process through the generation of maskworks/photomasks to generate one or more hardware devices embodying aspects of the present invention as described herein.

Embodiments of the present invention yield several advantages over conventional methods of transferring processing outputs to memory. By opportunistically combining data outputs from one or more processing units and address information associated with the data outputs, embodiments of the present invention better utilize the entire communication bandwidth available from the processing units to the memory in order to yield substantially faster transfers of the output data to memory.

While various embodiments of the present invention have been described above, it should be understood that they have been presented by way of example only, and not limitation. It will be understood by those skilled in the relevant art(s) that various changes in form and details may be made therein without departing from the spirit and scope of the present invention as defined in the appended claims. It should be understood that the present invention is not limited to these examples. The present invention is applicable to any elements operating as described herein. Accordingly, the breadth and scope of the present invention should not be limited by any of the above-described exemplary embodiments, but should be defined only in accordance with the following claims and their equivalents.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
   receiving, by a processing unit of a receiver, information from a transmitter associated with an audio data;
   storing, by the processing unit of the receiver, the information associated with the audio data; and
   transmitting, by the processing unit of the receiver, a silent data stream generated based on the stored information associated with the audio data to a display such that the silent data stream is output from the display.

2. The method of claim 1, further comprising:
   detecting that transmission of the audio data from the transmitter is stopped.

3. The method of claim 1, further comprising:
   receiving a request from the transmitter for outputting the silent data stream.

4. The method of claim 3, further comprising:
   transmitting the audio data to the display before receiving the request.

5. The method of claim 1, further comprising:
   receiving an initialization request from the transmitter; and
   transmitting data indicating ability to transmit the silent data stream to the display.

6. The method of claim 1, further comprising:
   retrieving the information associated with the audio data before transmitting the silent data stream to the display.

7. The method of claim 1, further comprising:
   receiving additional audio data including second information associated with the additional audio data;
   determining whether the second information is similar to the stored information; and
   if the second information and the stored information are similar:
     transmitting the received additional audio data to the display;
     transmitting the stored information to the display; and
   if the second information and the stored information are not similar, transmitting the received additional audio data including the second information to the display.

8. The method of claim 1, further comprising:
   receiving a request to stop transmitting the silent data stream; and
   discontinuing transmitting the silent data stream to the display.

9. The method of claim 1, further comprising:
   using wireless devices as the receiver and the transmitter.

10. A method, comprising:
    transmitting, by a processing unit of a transmitter, audio data including information associated with the audio data stream to a receiver; and
    transmitting to the receiver, by the processing unit, a request for transmitting silent data stream that causes the receiver to transmit the silent data stream generated based on the information associated with the audio data to a display in response to the request.

11. The method of claim 10, further comprising:
    transmitting an initialization request to the receiver; and
    receiving, from the receiver, capability data indicating ability of the receiver to transmit the silent data stream.

12. The method of claim 10, further comprising:
    transmitting a request to stop the transmitting the silent data stream; and
    causing the wireless receiver to discontinue transmitting the silent data stream to the display receiver.

13. An apparatus, comprising:
    a receiver configured to receive information associated with an audio data; a display decoder configured to store the information associated with the audio data; and
    a display transmitter configured to transmit a silent data stream generated based on the stored information associated with the audio data to a display.

14. The apparatus of claim 13, wherein the receiver is further configured to receive a request for outputting the silent data stream.

15. The apparatus of claim 14, wherein the display transmitter is configured to transmit the audio data to the display before receiving the request.

16. The apparatus of claim 13, wherein the receiver is further configured to:
    receive an initialization request; and
    transmit data indicating ability to transmit the silent data stream to the display.

17. The apparatus of claim 13, wherein the display decoder is further configured to retrieve the information associated with the audio data before the silent data stream being transmitted to the display.

18. The apparatus of claim 13, wherein:
    the receiver is further configured to receive additional audio data including second information associated with the additional audio data;
    the display decoder is further configured to determine whether the second information is similar to the stored information; and
    if the second information and the stored information are similar, the display transmitter is configured to:
      transmit the received additional audio data to the display;
      transmit the stored information to the display; and
    if the second information and the stored information are not similar, the display transmitter is configured to transmit the received additional audio data including the second information to the display receiver.

19. The apparatus of claim 13, wherein:
    the receiver is configured to receive a request to stop transmitting silent data stream; and
    the display transmitter is configured to discontinue transmitting the silent data stream to the display.

20. An apparatus, comprising:
    transmitter configured to transmit audio data including information associated with the audio data to a receiver and to transmit a request for transmitting silent data stream; and
    an audio driver configured to cause the receiver to transmit the silent data stream generated based on the information.

21. The apparatus of claim 20, wherein the transmitter comprises a radio transmitter and wherein the radio transmitter is further configured to:
    transmit an initialization request to the receiver; and
    receive data indicating ability of the receiver to transmit the silent data stream.

22. The apparatus of claim 20, wherein:
    the transmitter is further configured to transmit a request to stop the transmitting the silent data stream; and
    the audio driver is further configured to cause the receiver to discontinue transmitting the silent data stream to the display.

23. An article of manufacture including a non-transitory computer-readable storage medium having instructions stored thereon, execution of which by a computing device causes the computing device to perform operations comprising:

receiving information associated with an audio data;

storing the information associated with the audio data; and transmitting a silent data stream generated based on the stored information associated with the audio data to a display such that the silent data stream is output from the display.

24. An article of manufacture including a non-transitory computer-readable storage medium having instructions stored thereon, execution of which by a computing device causes the computing device to perform operations comprising:

transmitting audio data including information associated with the audio data to a receiver;

transmitting to the receiver, a request for transmitting silent data stream that causes the receiver to transmit the silent data stream generated based on the information associated with the audio data to a display receiver in response to the request.

* * * * *